US011276218B2

(12) United States Patent
Liu et al.

(10) Patent No.: US 11,276,218 B2
(45) Date of Patent: Mar. 15, 2022

(54) METHOD FOR SKINNING CHARACTER MODEL, DEVICE FOR SKINNING CHARACTER MODEL, STORAGE MEDIUM AND ELECTRONIC DEVICE

(71) Applicant: NETEASE (HANGZHOU) NETWORK CO., LTD., Hangzhou (CN)

(72) Inventors: Lijuan Liu, Hangzhou (CN); Di Tang, Hangzhou (CN); Yi Yuan, Hangzhou (CN); Changjie Fan, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 16/836,242

(22) Filed: Mar. 31, 2020

(65) Prior Publication Data

US 2020/0410733 A1 Dec. 31, 2020

(30) Foreign Application Priority Data

Jun. 25, 2019 (CN) .......................... 201910554549.8

(51) Int. Cl.
*G06T 13/40* (2011.01)
*G06T 15/10* (2011.01)

(52) U.S. Cl.
CPC .............. *G06T 13/40* (2013.01); *G06T 15/10* (2013.01)

(58) Field of Classification Search
None
See application file for complete search history.

(56) References Cited

U.S. PATENT DOCUMENTS

| | | | | |
|---|---|---|---|---|
| 6,317,130 B1* | 11/2001 | Ishikawa | ................. | G06T 13/40 345/473 |
| 8,531,464 B1* | 9/2013 | Cohen Bengio | ........ | G06T 13/40 345/473 |
| 10,646,156 B1* | 5/2020 | Schnorr | ............... | G06N 3/0454 |
| 10,873,456 B1* | 12/2020 | Dods | ........................ | H04L 9/14 |

(Continued)

OTHER PUBLICATIONS

Andreas Alexandros Vasilakis, Ioannis Fudos, "Skeletal Rigid Skinning with Blending Patches on the GPU", 2014, University of Ioannina (Year: 2014).*

*Primary Examiner* — YuJang Tswei
(74) *Attorney, Agent, or Firm* — Qinghong Xu

(57) ABSTRACT

Embodiments of the present disclosure provide a method for skinning a character model, a device for skinning a character model, a computer readable medium, and an electronic device, and relate to the field of computer technology. The method comprises: obtaining a first character model and a corresponding skeleton structure; determining a vertex attribute of the first character model and a connecting relationship between the vertices; performing a nonlinear transformation process on the vertex attribute to obtain the first feature, and performing a graph convolution process on the connecting relationship and the first feature to obtain a second feature; determining a global feature and a local feature of the character model according to the second feature; and determining a target feature representing a binding relationship between the first character model and the skeleton hierarchy according to the global feature and the local feature.

13 Claims, 10 Drawing Sheets

(56) References Cited

U.S. PATENT DOCUMENTS

| | | | |
|---|---|---|---|
| 2011/0292034 A1* | 12/2011 | Corazza | G06T 13/40 345/419 |
| 2019/0035132 A1* | 1/2019 | Dirksen | H04N 19/463 |
| 2019/0206145 A1* | 7/2019 | Li | G06T 15/503 |
| 2019/0266780 A1* | 8/2019 | Le Floch | G06T 13/40 |
| 2020/0402307 A1* | 12/2020 | Tanwer | G06T 15/005 |

* cited by examiner

METHOD FOR SKINNING CHARACTER MODEL, DEVICE FOR SKINNING CHARACTER MODEL, STORAGE MEDIUM AND ELECTRONIC DEVICE

CROSS-REFERENCE TO RELATED APPLICATIONS

This application claims priority to Chinese Patent application No. 201910554549.8, filed on Jun. 25, 2019 and entitled "METHOD FOR SKINNING CHARACTER MODEL, DEVICE FOR SKINNING CHARACTER MODEL, STORAGE MEDIUM AND ELECTRONIC DEVICE," which is herein incorporated by reference in its entirely.

TECHNICAL FIELD

Embodiments of the present disclosure relate to the field of computer technology, and more particularly, to a skinning method for a character model, a skinning device for a character model, a computer readable medium, and an electronic device.

BACKGROUND

Skinning is a 3D animation technique that can be applied to acid skeleton hierarchy to character models in 3D games. Since the skeleton hierarchy and the character model are independent from each other, changes in the skeleton hierarchy by skinning the character model can drive the character model to produce corresponding movement.

In general, the model skinning can be done by creating a character model, then adding a skeleton hierarchy to the character model and making a skeletal animation, and then binding the character model to the skeleton hierarchy. After relative positions of the joint points of the skeleton are changed, a server or a device will calculate the grid vertex coordinates of the changed character model according to the binding information, so as to drive the grid of the character model to deform; wherein related staffs can bind a corresponding skeletal joint points to each grid vertex, that is, driving the skeletal joint points of the moving vertices of the grid, and setting weights of these skeletal joint points on the grid vertices as binding information.

The above method for skinning a character model is based on the distance between the grid vertices of the character model and the joint points in the skeleton hierarchy. In such algorithm, it is assumed that the skeleton closest to a region of the model to be bound will definitely affect the motion of the region. However, for a character model with complex costumes, the skeleton hierarchy of the complex costumes cannot meet the assumption that the joint points might affect the grid vertices closest to the joint pinots. Therefore, the above method for skinning a character model is usually not applicable to complex character models.

It should be noted that the information disclosed in the Background section above is merely for enhancement of understanding of the background of the present disclosure, and thus may include information that does not constitute prior arts known to one of ordinary skill in the art.

SUMMARY

Embodiments of the embodiments of the present disclosure provide a method for skinning a character model, a device for skinning a character model, a computer readable medium, and an electronic device, and can overcome the problem that the conventional skinning method cannot be applicable to a relatively complicated character model to some extent, and the conventional skinning method is improved to obtain a wider application range.

According to a first aspect of the present disclosure, a method for skinning a character model is provided; comprising:

obtaining a first character model and a corresponding skeleton hierarchy:

determining a vertex attribute of the first character model and a connecting relationship between the vertices; wherein the vertex attribute comprises a vertex feature and a distance feature of a vertex in the first character model to a joint point in the skeleton hierarchy, and the vertex feature comprises a vertex geometric feature and/or a vertex geometric feature operator;

performing a nonlinear transformation process on the vertex attribute to obtain a first feature, and performing a graph convolution process on the connecting relationship and the first feature to obtain a second feature;

performing a nonlinear transformation process on the second feature to obtain a global feature of the first character model, and performing a graph convolution process on the second feature to obtain a local feature of the first character model;

determining a target feature representing a binding relationship between the first character model and the skeleton hierarchy according to the global feature and the local feature, so as to determine a second character model corresponding to the skeleton hierarchy in different postures according to the target feature.

According to an exemplary element of the present disclosure, the method for skinning a character model further comprises:

determining the vertex geometric feature according to the connecting relationship between the vertices in the first character model; wherein the vertex geometric feature comprises a normal vector and coordinates;

extracting a vertex geometric feature operator from the vertex geometric feature.

According to an exemplary element of the present disclosure, the method for skinning a character model further comprises:

determining a distance feature according to the connecting relationship between the vertices in the first character model and spatial coordinates of the vertices, a connecting relationship between the joint points in the skeleton hierarchy, and spatial coordinates of the joint points.

According to an exemplary element of the present disclosure, the method for skinning a character model further comprises:

performing feature transformation process on the target feature to obtain a influence probability on the weight of the joint point in the skeleton hierarchy on the vertices in the first character model.

According to an exemplary element of the present disclosure, the method for skimming a character model further comprises:

determining an actual influence probability on weight of vertices in the skeleton hierarchy on joint points in the first character model; and calculating a distance between the actual influence probability on weight and the influence probability on weight.

According to an exemplary element of the present disclosure, the method for skinning a character model further comprises:

iteratively adjusting parameters corresponding to the nonlinear transformation process and the graph convolution process according to the distance until an iteration number reaches a preset number, so as to make the distance less than a preset distance.

According to an exemplary element of the present disclosure, the method for skinning a character model further comprises:

determining a second character model corresponding to the skeleton hierarchy in the present postures according to the influence probability weight corresponding to the iteratively adjusted parameters.

According to a second aspect of the present disclosure, a device for skinning a character model is provided, comprising a model obtaining unit, a feature determining unit, and a feature transforming unit, wherein:

the model obtaining model is configured to obtain a first character model and a corresponding skeleton hierarchy;

the feature determining unit is configured to determine vertex attribute of the first character model and connecting relationships between the vertices; wherein the vertex attribute comprises a vertex feature and a distance feature of vertices in the first character model to joint points in the skeleton hierarchy, and the vertex feature comprises a vertex geometric feature and/or a vertex geometric feature operator;

the feature transforming unit is configured to perform a nonlinear transformation process on the vertex attribute to obtain a first feature, and to perform a graph convolution on the connecting relationships and the first feature to obtain a second feature;

the feature transforming unit is further configured to perform nonlinear transformation process on the second feature to obtain a global feature of the first character model, and to perform a graph convolution on the second feature to obtain a local feature of the first character model; and the character determining unit is further configured to determine a target feature representing a binding relationship between the first character model and the skeleton hierarchy according to the global feature and the local feature, so as to determine a second character model corresponding to the skeleton hierarchy in different postures according to the target feature.

In an exemplary embodiment of the present disclosure, the feature determining unit is further configured to determine the vertex geometric feature according to the connecting relationship between the vertices in the first character model; wherein the vertex geometric feature comprises a normal vector and coordinates.

The device for skinning a character model further comprises a geometric feature operator extracting unit, wherein:

the geometric feature extracting unit is configured to extract the vertex geometric feature operator from the vertex geometric feature.

In an exemplary embodiment of the present disclosure, the feature determining unit is further configured to determine a distance feature according to the connecting relationship between the vertices in the first character model and spatial coordinates of the vertices, the connecting relationship between the joint points in the skeleton hierarchy, and spatial coordinates of the joint points.

According to an exemplary element of the present disclosure, the device for skinning a character model further comprises an influence probability on weight determining unit, wherein:

the influence probability on weight determining unit is further configured to obtain influence probability on weight of the joint points in the skeleton hierarchy on the vertices in the first character model by performing feature transformation process on the target feature.

In an exemplary embodiment of the present disclosure, the influence probability on weight determining unit if further configured to determine an actual influence probability on weight of the joint points in the skeleton hierarchy on the vertices in the character model.

The device for skinning a character model further comprises a distance calculating unit, wherein the distance calculating unit is configured to calculate a distance between the actual influence probability on weight and the influence probability on weight.

In an exemplary embodiment of the present disclosure, the device for skinning a character model further comprises a parameter adjusting unit, wherein:

the parameter adjusting unit is configured to iteratively adjust parameters respectively corresponding to the nonlinear transformation process and the graph convolution process according to the distance until an iteration number reaches a preset number, so as to make the distance less than a preset distance.

In an exemplary element of the present disclosure, the device for skinning a character model further comprises a character model determining unit, wherein:

the character model determining unit is configured to determine a second character model corresponding to the skeleton hierarchy in the target postures according to the influence probability on weight corresponding to the iteratively adjusted parameters.

According to a third aspect of the disclosure, a computer readable medium having a computer instructions stored thereon is provided, when the computer instructions executed by a processor, the computer instructions implements the method for skinning a character model according to the first aspect of the present disclosure.

According to a fourth aspect of the disclosure, an electronic device is provided, comprising: one or more processors, and a storage device, configured to store one or more programs, when implemented by the one or more processors, the one or more programs make the one or more processors implement the method for skinning a character model according to the first aspect of the present disclosure.

The technical solutions provided by the embodiments of the preset disclosure can comprise the following beneficial effects.

In the technical solutions according to the embodiments of the present disclosure, a first character model (a person model) and its corresponding skeleton hierarchy are first obtained, and further, vertex attribute of the first character model and the connecting relationship between the vertices (such as grid connecting lines between the vertices) can be determined; wherein the vertex attribute comprises a vertex feature and a distance feature of the vertices in the first character model to the joint points in the skeleton hierarchy, the vertex feature comprises a vertex geometric feature and a vertex geometric feature operator; and further, a nonlinear transformation process is performed on the vertex attribute so as to obtain a first feature, and a graph convolution process is performed on the connecting relationships and the first feature so as to obtain a second feature and a nonlinear transformation process is performed on the second feature so as to obtain a global feature, and a graph convolution process is performed on the second feature so as to obtain a local feature of the first character model, so as to determine a target feature representing a binding relationship between the first character model and the skeleton hierarchy, thereby determining a second character model corresponding to the skeleton hierarchy in different postures according to the target feature. According to the technical solutions described above, on one hand, the present disclosure can overcome the problem that the traditional skinning method cannot be applicable to a relatively complicated character model to some extent, and the traditional skinning method is improved to obtain a wider application scope; and on the other hand, it is possible to efficiently represent each vertex by extracting the feature set of the first character model, and to learn the binding feature (i.e., the target feature) of the vertex through the depth graph convolution network, thereby improving the skinning accuracy and the skinning efficiency for the character model, so as to reduce the workload of manual operation for binding a character model and a skeleton hierarchy.

It should be understood that, the above general description and the following detailed description are merely illustrative and explanatory and cannot be construed as a limit to the present disclosure.

BRIEF DESCRIPTION OF THE DRAWINGS

The accompanying drawings, which are incorporated in and constitute a part of the description, illustrates embodiments in consistent with the present disclosure, and are used to explain the principles of the present disclosure along in connection with the description. Obviously, the drawings in the following description are merely some of the embodiments of the present disclosure, and one of ordinary skill in the art can obtain other drawings based on the drawings without any creative work.

DETAILED DESCRIPTION

Figure 1:
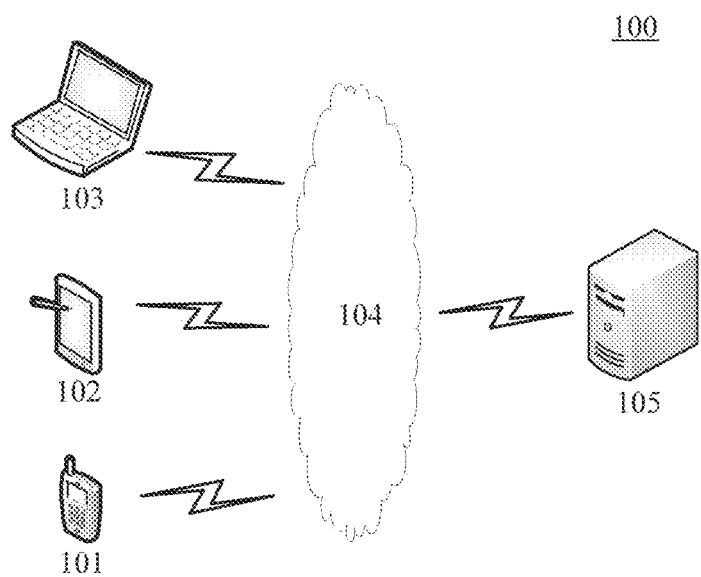
FIG. 1 is a schematic diagram illustrating an illustrative system architecture in which a method for skinning a character model and a device for skinning a character model according to an embodiment of the present disclosure can be applied.

Example embodiments will now be described more fully with reference to the accompanying drawings. However, the examples of the embodiments can be embodied in a variety of forms and should not be construed as being limited to the examples set forth herein; rather, these embodiments are provided so that this disclosure will be more comprehensive and complete and conceptions of the examples of the embodiments are entirely delivered to one of ordinary skill in the art. The described features, structures, or characteristics may be combined in any suitable manner in one or more embodiments. In the following description, numerous specific details are provided for fully understanding of the embodiments of the present disclosure. However, one of ordinary skill in the art will appreciate that the technical solutions of the present disclosure can be implemented, with omitting one or more of the specific details, or by other methods, elements, devices, or steps and the like. In other instances, commonly used technical features are not illustrated or described, in order to avoid obscuring various aspects of the present disclosure.

In addition, the drawings are merely schematic representations of the present disclosure and are not drawn to scale. The same reference numerals in the drawings denote the same or similar parts, and the repeated description thereof will be omitted. Some of the blocks illustrated in the figures are functional entities and do not necessarily have to correspond to physically or logically separate entities. These functional entities may be implemented in software, or implemented in one or more hardware modules or integrated circuits, or implemented in different network and/or processor devices and/or microcontroller devices.

FIG. 1 is a schematic diagram illustrating a system architecture for an illustrative application environment in which a method for skinning a character model and a device for skinning a character model according to an embodiment of the present disclosure can be applied.

As illustrated in FIG. 1, a system architecture 100 can comprise one or more of terminal devices 101, 102, 103, a network 104 and a server 105. The network 104 is used to provide a medium for communication links between the terminal devices 101, 102, 103 and the server 105. The network 104 can comprise various types of connections, such as wired or wireless communication links, fiber optic cables, and the like. The terminal devices 101, 102, 103 can be various electronic devices having a display screen comprising, but not limited to, a desktop computer, a portable computer, a smart phone, a tablet, and the like. It should be understood that the number of the terminal devices, the networks, and the servers in FIG. 1 is merely illustrative. Depending on the implementation requirements, there can be any number of the terminal devices, the networks, and the servers. For example, the server 105 can be a server cluster composed of a plurality of servers or the like.

The method for skinning a character model according to an embodiment of the present disclosure is typically implemented by the server 105, and accordingly, the device for skinning a character model is typically arranged in the server 105. However, it is easily understood by those skilled in the art that the method for skinning the character model according to the embodiments of the present disclosure can further be performed by the terminal device 101, 102 or 103, and accordingly, the device for skinning the character model can further be arranged on the terminal device 101, 102 or 103, which is not specifically limited in the exemplary embodiment. For example, in an exemplary embodiment of the present disclosure, the server 105 can obtain a first character model and a corresponding skeleton structure, and further, the server 105 can determine a vertex attribute of the first character model and a connecting relationship between vertices; and the server 105 can perform nonlinear transformation process on the vertex attribute so as to obtain a first feature, and perform a graph convolution process on the connecting relationship and the first feature so as to obtain a second feature; obtain a global feature of the first character model by performing a nonlinear transformation process on the second feature, and perform a graph convolution process on the first character model to obtain a local feature of the first character model; and determine a target feature representing a binding relation between the first character model and the skeleton structure according to the global feature and the local feature, so as to determine a second character model corresponding to the skeleton hierarchy in different postures. The execution body of the present disclosure may be any one of the terminal devices 101, 102 or 103 in addition to the server 105 described above.

Figure 2:
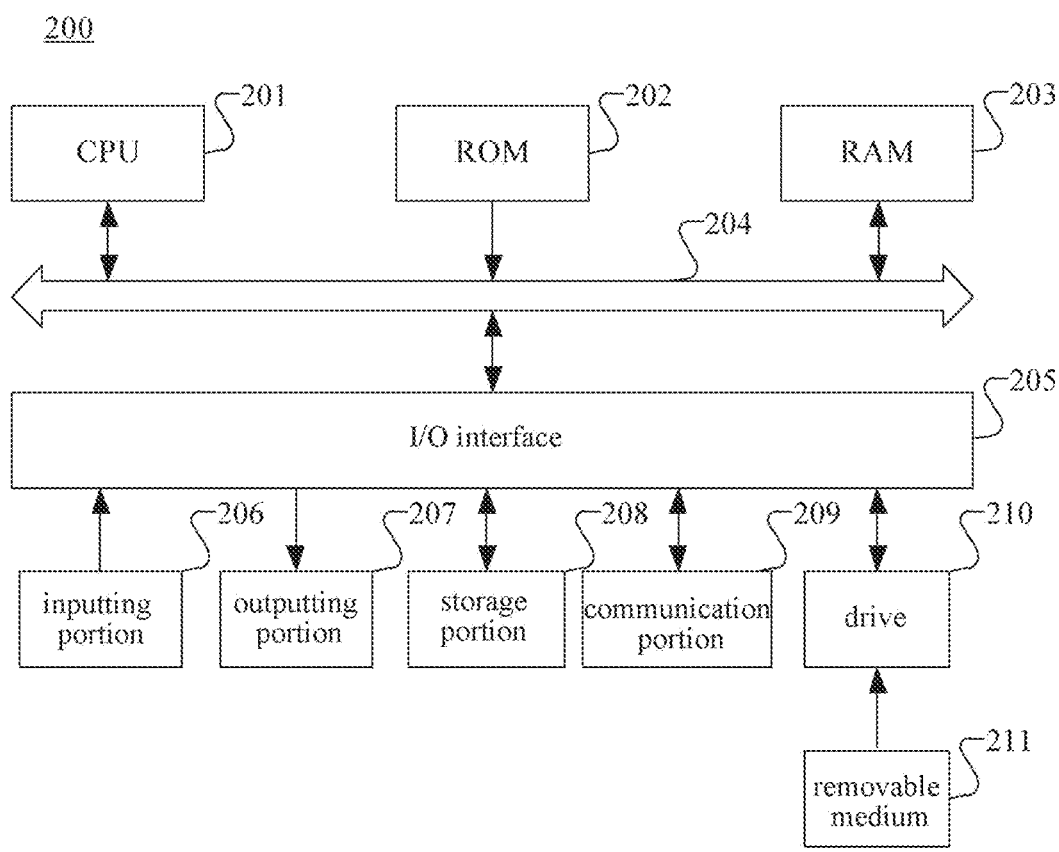
FIG. 2 is a schematic structural diagram schematically illustrates a block diagram of a computer system which is configured to implement an electronic device according to an exemplary embodiment of the present disclosure.

FIG. 2 is a schematic structural diagram schematically illustrating a block diagram of a computer system which is configured to implement an electronic device according to an exemplary embodiment of the present disclosure.

It should be understood that, the computer system 200 for the electronic device is merely an example and should not be construed as a limit to the function and application scope of the embodiments of the present disclosure.

As illustrated in FIG. 2, the computer system 200 comprises a central processing unit (CPU) 201 that can perform various suitable action and processes according to programs stored on a read only memory or according to programs loaded to a random access memory from a storage portion 208. Various programs and data required for system operation are also stored in the RAM 203. The CPU 201, the ROM 202, and the RAM 203 are connected to each other through a bus 204. An input/output (I/O) interface 205 is further connected to the bus 204.

The following components are connected to the I/O interface 205: an inputting portion 206 comprising a keyboard, a mouse, and etc.; an outputting portion 207 comprising a cathode ray tube (CRT), a liquid crystal display (LCD), and the like, and a speaker; a storage portion 208 comprising a hard disk or the like, and a communication portion 209 comprising a network interface card such as a LAN card, a modem, or the like. The communication portion 209 performs communication processing via a network such as the Internet. A drive 210 is further connected to the I/O interface 205 as required. A removable medium 211, such as a magnetic disk, an optical disk, a magneto-optical disk, a semiconductor memory or the like, is mounted on the drive 210 as required so that a computer program read therefrom is installed on the storage portion 208 as required.

In particular, according to an embodiment of the present disclosure, a process described below with reference to the flowcharts can be implemented as a computer software program. For example, an embodiment of the present disclosure comprises a computer program product comprising a computer program embodied on a computer readable medium, the computer program comprises program codes for executing the method illustrated in the flowchart. In such an embodiment, the computer program can be downloaded and installed from the network via the communication portion 209, and/or installed from the removable medium 211. When the computer program is executed by the central processing unit (CPU) 201, various functions defined in the methods and the devices of the present disclosure are performed. In some embodiments, the computer system 200 can further comprise an AI (Artificial Intelligence) processor for processing computational operations related to machine learning.

It should be noted that the computer readable medium illustrated in the present disclosure can be a computer readable signal medium or a computer readable storage medium or any combination thereof. The readable storage medium can be, for example, but not limited to, a system, an apparatus, or a device of electronic, magnetic, optical, electromagnetic, infrared, or semiconductor, or any combination of the above. More specific examples of readable storage media comprise: electrical connections with one or more wires, portable disks, hard disks, random access memory (RAM), read only memory (ROM), erasable Programmable read-only memory (EPROM or flash memory), optical fiber, portable compact disk read only memory (CD-ROM), optical storage device, magnetic storage device, or any suitable combination of the foregoing. The computer readable storage medium in the present disclosure can be any tangible medium containing or storing a program that can be used by or in connection with an instruction execution system, device or apparatus. In the present disclosure, the computer readable signal medium can comprise a data signal that is propagated in the baseband or as part of a carrier, and carries computer readable program codes. Such propagated data signal can take a variety of forms comprising, but not limited to, electromagnetic signals, optical signals, or any suitable combination of the foregoing. The computer readable signal medium can be any computer readable medium except the computer readable storage medium, and the computer readable medium can send, propagate, or transmit a program used by or in conjunction with an instruction executing system, apparatus, or device. Program code comprised in the computer readable medium can be transmitted through any suitable medium, comprising but not limited to wireless, wire, optical cable, RF, and etc., or any suitable combination of the foregoing.

The flowcharts and the block diagrams in the Figures illustrate architectures, functions, and operations that the systems, the methods, and the computer program products in accordance with various embodiments of the present disclosure can implement. In this regard, each block in the flowchart or the block diagrams can represent a module, a program segment, or a portion of codes that comprises one or more executable instructions that is used to implement specific logic functions. It should also be noted that in some alternative implementations, the functions noted in the blocks can further occur in a different order than that illustrated in the drawings. For example, two successively represented blocks can in fact be executed substantially in parallel, and they may sometimes be executed in the reverse order, depending upon the functionality involved. It is also noted that each block in the block diagrams or the flowcharts, and combinations of blocks in the block diagrams or the flowcharts, can be implemented by a dedicated hardware-based system that performs the specified function or operation, or can be implemented by a combination of dedicated hardware and computer instructions.

The units described in the embodiments of the present disclosure can be implemented by software, or can be implemented by hardware, and the described units can further be disposed in the processor. And the names of these units do not constitute a limit on the unit itself in some cases.

In another aspect, the present disclosure further provides a computer readable medium, which can be included in an electronic apparatus described in the above embodiments, or can be separately present without being assembled into the electronic apparatus. The computer readable medium carries one or more programs that, when executed by one of the electronic apparatus, cause the electronic apparatus to implement a method as described in the following embodiments. For example, the electronic apparatus can implement various steps as illustrated in FIGS. 3 to 5 and FIGS. 10 to 11.

Hereinafter, the technical solutions provided by the present disclosure will be described in details.

In the creation of game characters, 3D model animation plays a very important role. The basic principle is to make the position of each vertex in the character model changes over time. One of the important branches is the skeleton skinning animation. Specifically, the skeletal skinning animation contains two parts, the skeleton and the skin. Usually, in the process of creating an animated character, the first work for an animating artist is modeling, that is, creating a character model, then adding skeleton to the model and making skeletal animation, and finally binding the character model to the skeleton. Thus, when the skeleton level changed, new model grid vertex coordinates can be calculated according to the binding information, so as to achieve the purpose of driving the grid to deform. Wherein, related persons can bind corresponding joint points of skeleton hierarchy to each vertex of the grid, that is, the joint points of the skeleton hierarchy driving the motion of the grid, and set influence weight of the joint points of the skeleton hierarchy on the vertices of the grid, as a binding information.

The above method for skinning model is based on the distance between the grid vertices of the character model and the skeletal joint points. Such algorithm assumes that the skeleton closest to a region of the model to be bound will definitely affect the motion of the region. However, for a character model with complex costumes, the skeleton hierarchy of the complex costumes cannot meet the assumption that the joint points must affect the vertices of the grid closest to the joint pinots. Therefore, the above model skinning method is usually not applicable to complex character models.

Figure 3:
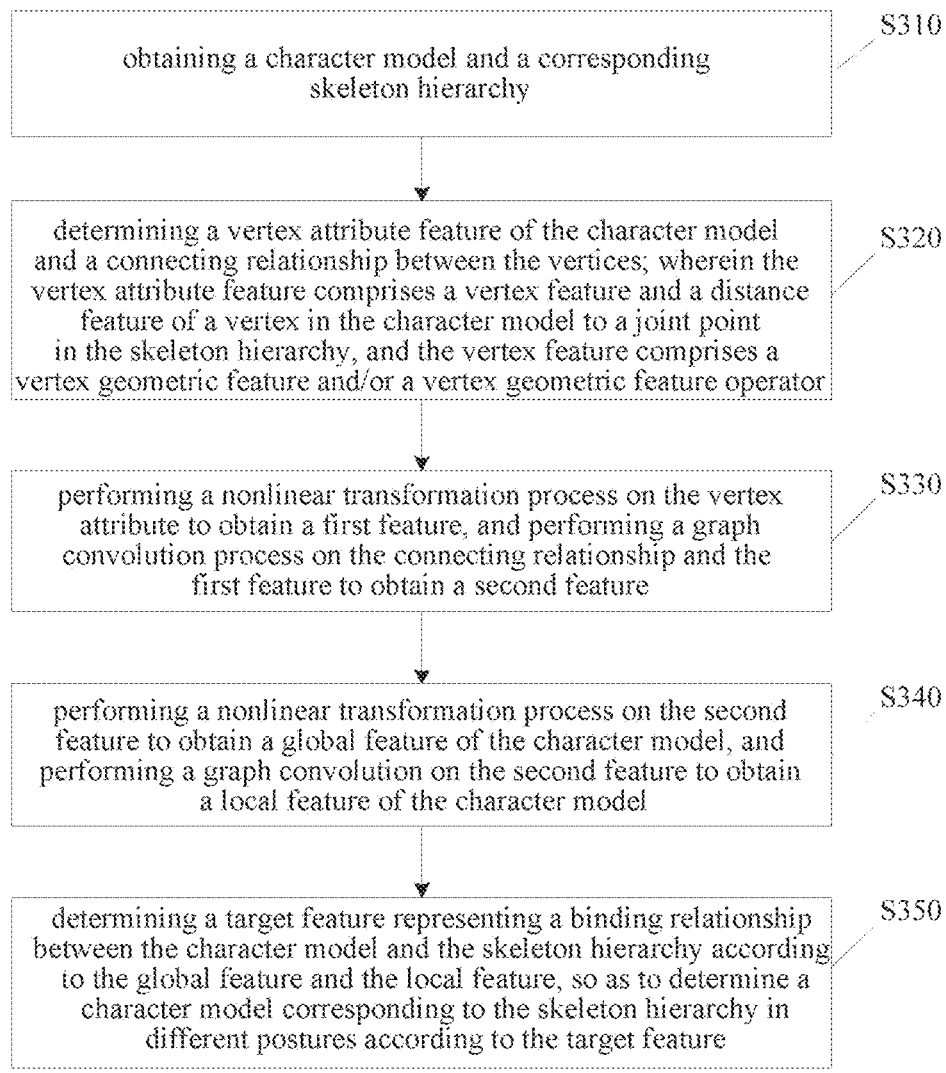
FIG. 3 schematically illustrates a flowchart of a method for skinning a character model according to an embodiment of the present disclosure.

Against one or more problems mentioned above, embodiments of the present disclosure provide a method for skinning a character model. The method for skinning the character model can be applied in the server 105 as described above, and further can be applied in one or more of the terminal device 101, 102 or 103, which is not specifically limited in the exemplary embodiment. Referring to FIG. 3, the method for skinning the character model can comprise the following steps S310 to S350:

In step S310, a first character model and a corresponding skeleton hierarchy are obtained.

In step S320, a vertex attribute of the first character model and a connecting relationship between the vertices is determined; wherein the vertex attribute comprises a vertex feature and a distance feature of a vertex in the first character model to a joint point in the skeleton hierarchy, and the vertex feature comprises a vertex geometric feature and/or a vertex geometric feature operator.

In step S330, a nonlinear transformation process is performed on the vertex attribute to obtain a first feature, and a graph convolution process is performed on the connecting relationship and the first feature to obtain a second feature.

In step S340, a nonlinear transformation process is performed on the second feature to obtain a global feature of the first character model, and a graph convolution is performed on the second feature to obtain a local feature of the first character model.

In step S350, a target feature representing a binding relationship between the first character model and the skeleton hierarchy is determined according to the global feature and the local feature, so as to determine a second character model corresponding to the skeleton hierarchy in different postures according to the target feature.

Embodiments of the present disclosure can be applied to skeletal animation, and the principle of skeletal animation can be: setting individual bones and joints, and then matching the attached skin to the skeleton. A character can be constituted by a single grid model and bones that are organized according to a certain hierarchy. Hereinafter, the above steps of the exemplary embodiment will be described in more detail.

In step S310, a first character model and a corresponding skeleton hierarchy are obtained.

In this example embodiment, the skeleton hierarchy can usually be represented as a tree containing joint points of bones, and the skeleton hierarchy can also be understood as a bone hierarchy, which describes the structure of the character model. Specifically, adjacent bones are connected by joints, and relative movements (e.g., rotation, translation, etc. can be made; wherein the bones have a parent-child relationship, for example, the right forearm can be a child node of the right upper arm, and can also be the parent node of the right hand. By changing the displacement and/or angle between adjacent bones, the first character model can be made to take different actions to achieve different animation effects. In addition, by binding weights, it is possible to calculate how the corresponding first character model moves under different actions of bones.

In this example embodiment, the first character model can be understood as a single grid structure of the skin for representing a created character, and any vertex in the grid structure that makes up the skin is affected by one or more bones.

In this example embodiment, optionally, the manner of obtaining the first character model and the corresponding skeleton hierarchy can be: calling a constructed character model and the corresponding skeleton hierarchy according to the user operation; or obtain a completed character model, and generating a skeleton hierarchy corresponding thereto according to the character model; or, generating a corresponding character model and a corresponding skeleton hierarchy according to an input model information. The user operation can be an operation of selecting a character model from multiple character models, and the model information comprises parameters for generating a character model, which is not limited in the embodiment of the present disclosure.

It can be seen that, in the embodiment, there are various manners for obtaining a first character model and its corresponding skeleton hierarchy, which reduces learning cost for skinning model, and improves the skin efficiency by generating the skeleton hierarchy automatically.

In step S320, a vertex attribute of the first character model and a connecting relationship between the vertices are determined; wherein the vertex attribute comprises a vertex feature and a distance feature of a vertex in the first character model to a joint point in the skeleton hierarchy, and the vertex feature comprises a vertex geometric feature and/or a vertex geometric feature operator.

In the embodiment, the vertex attribute is used to represent attribute of each vertex in the character model grid structure, and the vertex attribute comprises a vertex feature and a distance feature of a vertex in the first character model to a joint point in the skeleton hierarchy. Wherein, the vertex features may comprise a vertex geometric feature (e.g., coordinates of the vertex in three-dimensional space, a normal vector, a curvature) and/or a vertex geometric feature operator (e.g., Laplace parameters, heat kernel signature (HKS) and wave kernel signature (WKS), etc.). The terminal device or the server may represent the vertex features corresponding to each vertex through feature vectors, such as coordinates, a normal vector, a curvature, Laplace parameter, HKS, WKS, and etc. In an optional embodiment, the vertex feature comprises coordinates and a normal vector.

In the embodiment, the distance feature is used to represent a distance from a vertex in the first character model to a joint point in the skeleton hierarchy. Specifically, it can also be understood that the distance from the vertex to the skeleton hierarchy is used as a feature of the grid data associated with data of the structure.

In the embodiment of the present example, since the first character model is a grid structure, and the grid structure comprises a plurality of vertices, the grid formed by connecting the vertices is the skin as mentioned above; wherein the connecting relationship between the vertices can be used to represent connecting relationship of each vertex to other vertices (e.g., direct or indirect).

Figure 4:
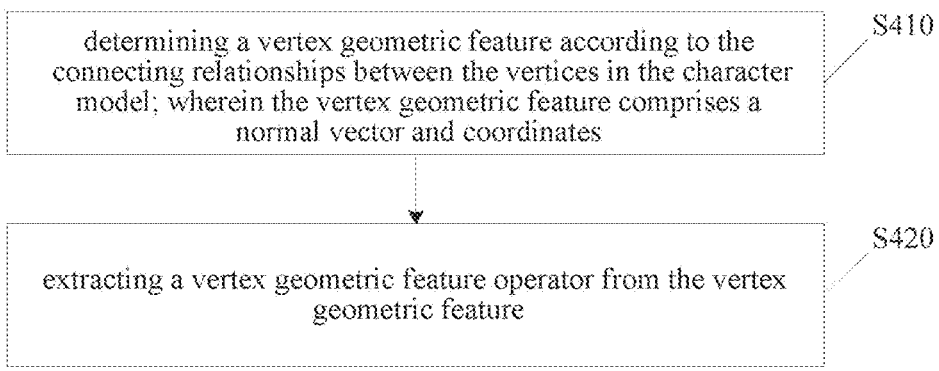
FIG. 4 schematically illustrates a flowchart of determining a vertex geometric feature operator according to an embodiment of the present disclosure.

In the exemplary embodiment, optionally, please refer to FIG. 4, which schematically illustrates a flowchart of determining a vertex geometric feature operator according to an embodiment of the present disclosure, as illustrated in FIG. 4, the method for skinning the character model can further comprise steps S410 and S420.

In step S410, a vertex geometric feature is determined according to the connecting relationships between the vertices in the first character model; wherein the vertex geometric feature comprises a normal vector and coordinates.

In step S420, a vertex geometric feature operator is extracted from the vertex geometric feature.

Hereinafter, the above steps of the present exemplary embodiment will be described in more detail.

In step S410, a vertex geometric feature is determined according to the connecting relationship between the vertices in the first character model; wherein the vertex geometric feature comprises a normal vector and coordinates, and further comprises Laplace parameters, heat kernel signature (HKS) and wave kernel signature (WKS), and scale-invariant heat kernel signature (SI-HKS).

In the present exemplary embodiment, the connecting relationship between the vertices can also be understood as the communicating relationship between the vertices. In addition, the vertex geometric feature can comprise basis vertex attributes such as a normal vector and coordinates.

In the exemplary embodiment, optionally, a specific manner for determining a vertex geometric feature according to the connecting relationships between vertices in the first character model can be determining a vertex geometric feature according to the connecting, relationships between the vertices in the first character model and the spatial coordinates of the vertices.

In step S420, a vertex geometric feature operator is extracted from the vertex geometric feature.

In this example embodiment, optionally, the manner of extracting the vertex geometric feature operator from the vertex geometric feature can be: determining a certain feature from the vertex geometric feature as a vertex geometric feature operator, wherein, the certain feature may be Laplace parameters, HKS, or WKS.

It can be seen that, through the flowchart of determining the vertex geometric feature operator as illustrated in FIG. 4, the vertex geometric feature can be determined through the connecting relationship of the vertices, and then a certain feature is extracted from the vertex geometric feature as a vertex geometric feature operator, so as to form a feature vector, and next a binding relationship between the first character model and the skeleton hierarchy is determined through the feature vector, which can improve the efficiency of manual binding of the character model and the skeleton hierarchy to a certain extent, so as to improve the skinning efficiency.

Figure 5:
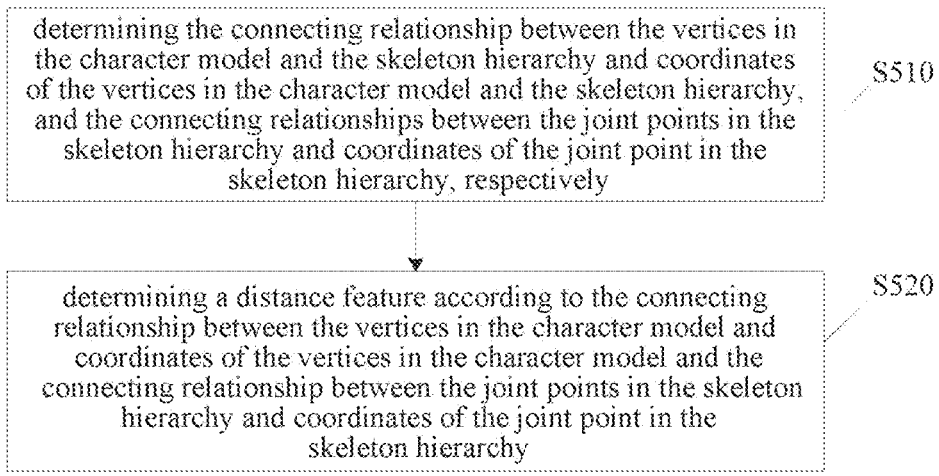
FIG. 5 schematically illustrates a flowchart of determining a distance feature according to an embodiment of the present disclosure.

In the exemplary embodiment, optionally, please refer to FIG. 4, which schematically illustrates a flowchart of determining a distance feature according to an embodiment of the present disclosure. As illustrated in FIG. 5, the method for skinning the character model can further comprise steps S510 and 520.

In step S510, the connecting relationship between the vertices in the first character model and spatial coordinates of the vertices in the first character model, and the connecting relationships between the joint points in the skeleton hierarchy and spatial coordinates of the joint point in the skeleton hierarchy are determined, respectively.

In step S520, a distance feature is determined according to the connecting relationship between the vertices in the first character model and spatial coordinates of the vertices in the first character model and the connecting relationship between the joint points in the skeleton hierarchy and spatial coordinates of the joint point in the skeleton hierarchy.

Hereinafter, the above steps of the present exemplary embodiment will be described in more detail.

In step S510, the connecting relationship between the vertices in the first character model and coordinates of the vertices in the first character model, and the connecting relationship between the joint points in the skeleton hierarchy and spatial coordinates of the joint points in the skeleton hierarchy are determined, respectively.

In the exemplary embodiment, as the first character model is constituted by connecting the vertices, and the skeleton hierarchy is constituted by connecting the bones through the joint points, the first character model has a connecting relationship between corresponding vertices. In addition, since the first character model can be a 3D model, and the first character model is in a three-dimensional space, each vertex in the first character model has corresponding spatial vertex coordinates. And further, the skeleton hierarchy has a connection relationship between its corresponding joint points. In addition, since the skeleton hierarchy can be a 3D structure, and the joint points in the skeleton hierarchy has corresponding spatial joint point coordinates.

In step S520, a distance feature is determined according to the connecting relationship between the vertices in the first character model and spatial coordinates of the vertices in the first character model and the connecting relationship between the joint points in the skeleton hierarchy and spatial coordinates of the joint point in the skeleton hierarchy.

In the exemplary embodiment, the distance feature can be a numeric value used to represent a distance from a vertex in the first character model to a joint point in the skeleton hierarchy, and the distance can be a Euclidean distance.

It can be seen that, through the flowchart of determining a distance feature illustrated in FIG. 5, the terminal device or the server can determine the distance from the vertex in the first character model to the joint point in the skeleton hierarchy, and then determine the binding relationship between the first character model and the skeleton hierarchy according to the distance, whereby improving the skinning efficiency and the skinning effects with respect to traditional manual binding.

In step S330, a nonlinear transformation process is performed on the vertex attribute to obtain a first feature, and a graph convolution process is performed on the connecting relationship and the first feature to obtain a second feature.

In this example embodiment, the first feature may be a feature matrix of N*64, and the second feature may be a feature matrix of N*576.

In the present exemplary embodiment, the nonlinear transformation process can be understood as the followings: converting a point of the X space into a point of the Z space by a preset function, and further obtaining a linear hypothesis in the Z space, and then returning to the original X space, and obtaining a second hypothesis. Specifically, it can be understood that the vertex attribute is converted into a first feature with more specific and physical meaning.

In the exemplary embodiment, optionally, the manner for performing the nonlinear transformation process on the vertex attribute to obtain the first feature can be: inputting the vertex attribute as an input feature into the multi-layer perceptron, so that the vertex attribute undergoes a multi-layer nonlinear transformation process in the multi-layer perceptron, and then the first feature corresponding to the vertex attribute is output.

Figure 6:
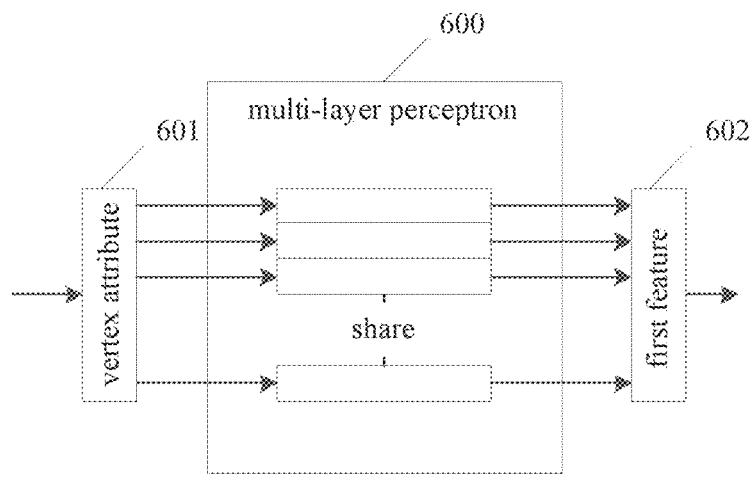
FIG. 6 schematically illustrates a schematic diagram of performing nonlinear transformation process on vertex attributes according to an embodiment of the present disclosure.

In the exemplary embodiment, please refer to FIG. 6, which schematically illustrates a schematic diagram of performing a nonlinear transformation process on vertex attributes according to an embodiment of the present disclosure. As illustrated in FIG. 6, the vertex attribute 601 is subject to the nonlinear transform process in the multi-layer perceptron 600 to obtain the first feature 602.

In this example, optionally, a manner for performing the graph convolution process on the connecting relationship and the first feature to obtain the second feature can be: performing a graph convolution process on the connecting relationship and the first feature to obtain the first sub-feature; performing a graph pooling process on the first sub-feature and the connecting relationship, and the result of the graph pooling process is spliced with the first sub-feature and the first feature to obtain a second feature.

Figure 7:
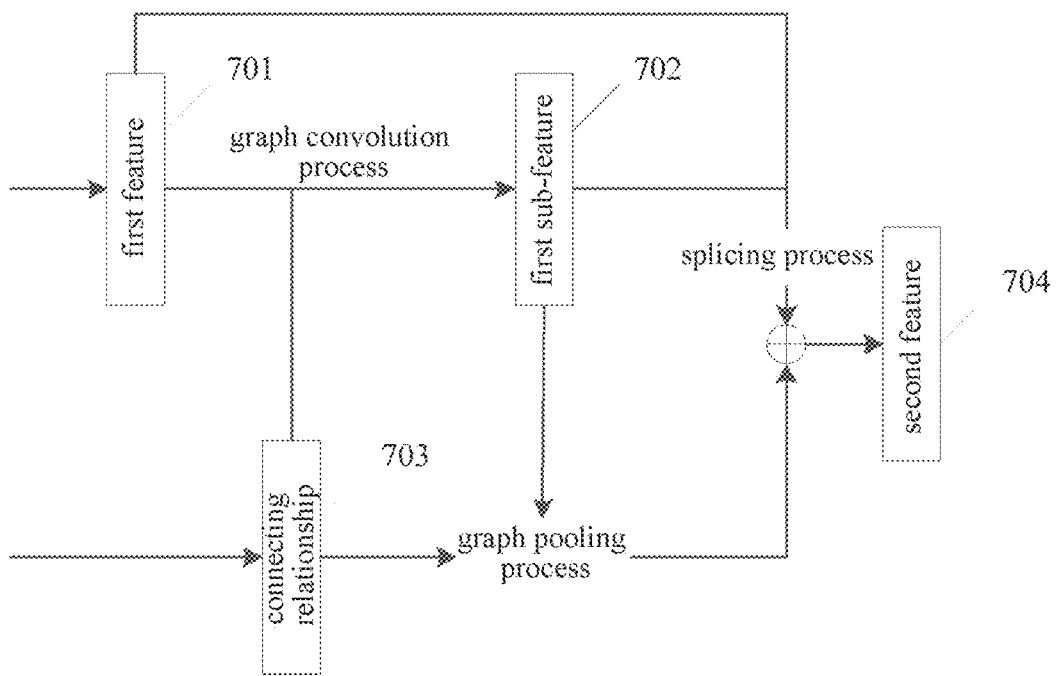
FIG. 7 schematically illustrates a schematic diagram of performing graph convolution process on the connecting relationships and the first feature transformation process on vertex attributes according to an embodiment of the present disclosure.

In the exemplary embodiment of the present disclosure, as illustrated in FIG. 7, FIG. 7 schematically illustrates a schematic diagram of performing a graph convolution process on the connecting relationship and the first feature according to an embodiment of the present disclosure. In this example, optionally, a graph convolution process is performed on the connecting relationship 703 and the first feature 701 so as to obtain a first sub-feature 702, a graph pooling process is performed on the first sub-feature 702 and the connecting relationship 703, and then, the result of the graph pooling process is spliced with the first sub-feature 702 and the first feature 701, and the second feature 704 is obtained.

In step S340, a nonlinear transformation process is performed on the second feature to obtain a global feature of the character model, and a graph convolution process is performed on the second feature to obtain a local feature of the character model.

In the present exemplary embodiment, the global feature of the character model refers to the overall attributes of the character model, such as color features, texture features, and shape features, and etc.

In the exemplary embodiment, optionally, the manner for performing the nonlinear transformation process on the second feature to obtain the global feature of the first character model can be: inputting the second feature into a multi-layer perceptron, so that the second feature is subject to a multilayer nonlinear transformation process in the multi-layer perceptron, and then an interlayer feature after transformation process is output, and next, a maximum pooling process is performed on the interlayer feature to obtain a pooling feature, and the pooling feature is duplicated, so as to obtain a global feature corresponding to the second feature.

In this example, optionally, a manner for performing the graph convolution process on the second feature to obtain the local feature of the first character model can be: performing a graph convolution process on the second feature and the connecting relationship to obtain a graph convolution feature, and performing a second graph convolution process on the graph convolution feature and the connecting relationship to obtain a local feature corresponding to the second feature.

It can be seen from the optional embodiment of the present disclosure, each vertex can be effectively represented by extracting a feature set of the first character model, and a binding feature (target feature) of the vertex can be learned through a depth graph convolution network, thereby improving the skinning accuracy and the skinning efficiency for the character model.

Figure 8:
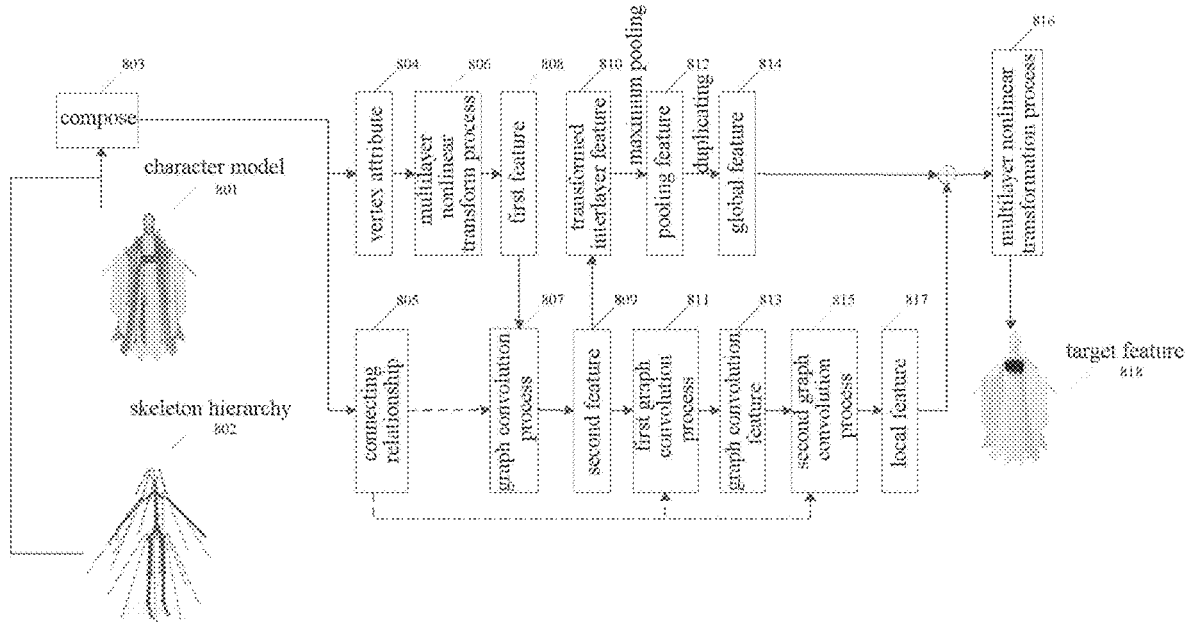
FIG. 8 schematically illustrates a schematic diagram of an algorithm for skinning a character model according to an embodiment of the present disclosure.

Please refer to FIG. 8, which schematically illustrates a schematic diagram of an algorithm for skinning a character model according to an embodiment of the present disclosure. As illustrated in FIG. 8, the server or the terminal device can compose 803 the first character model 801 and the skeleton hierarchy 802 to obtain the vertex attribute 804 and the connecting relationship 805. It can also be understood as determining the vertex attribute of the first character model and the connecting relationship between the vertices. Further, the first feature 808 can be obtained by subjecting the vertex attribute 804 to the nonlinear transform process 806 of the multilayer perceptron; further, a graph convolution process 807 is performed on the connecting relationship 805 and the first feature 808 to obtain the second feature 809; next, the second feature 809 can be input to the multilayer perceptron such that the second feature 809 undergoes multilayer nonlinear transformation process in the multilayer perceptron, thereby outputting the transformed interlayer feature 810, and a maximum pooling process is performed on the transformed interlayer feature 810 and a pooling feature 812 can be obtained, and then the pooling feature 812 is duplicated to obtain a global feature 814 corresponding to the second feature 809. Further, a first graph convolution process 811 is performed on the second feature 809 and the connecting relationship 805, to obtain a graph convolution feature 813, a second graph convolution process 815 is performed on the graph convolution feature 813 and the connecting relationship 805, so as to obtain a local feature 817 corresponding to the second feature 809, and further, the global feature 814 and the local feature 817 are spliced, and a multilayer nonlinear transformation process 816 is performed on the splicing result, so as to obtain a target feature 818, which is used to represent a binding relationship between the character model and the skeleton hierarchy.

It can be seen that, through the algorithm for skinning the character model as illustrated in FIG. 8, each vertex can be effectively represented through extracting a feature set of the first character model, and the binding feature (i.e., the target feature) can be obtained through deep learning in graph convolution network, thereby improving the skinning accuracy and the skinning efficiency for the first character model, and reducing workload of manual binding the first character model and the skeleton hierarchy.

In step S350, a target feature representing a binding relationship between the first character model and the skeleton hierarchy is determined according to the global feature and the local feature, so as to determine a second character model corresponding to the skeleton hierarchy in different postures according to the target feature.

In the exemplary embodiment, the target feature can be a binding weight of the vertices of the first character model with the bones in the skeleton hierarchy.

Figure 9:
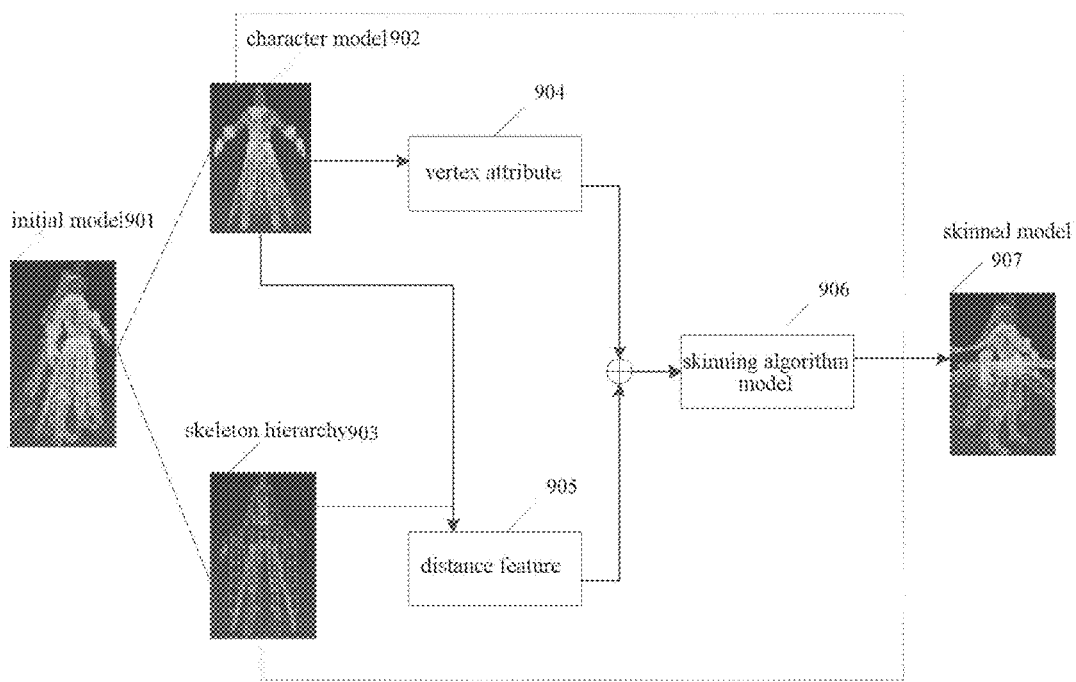
FIG. 9 schematically illustrates a schematic diagram of processes for skinning a character model according to an embodiment of the present disclosure.

Please refer to FIG. 9, which schematically illustrates a schematic process diagram for skinning a character model according to an embodiment of the present disclosure. As illustrated in FIG. 9, an initial model 901 can be composed of a character model 902 and a skeleton hierarchy 903. The server or the terminal device can obtain a vertex attribute 904 from the character model 902, and can further determine a distance feature 905 according to the character model 902 and the skeleton structure 903. Further, the vertex attribute 904 and the distance feature 905 are spliced and input into a skinning algorithm model 906, and a binding feature of the character model 902 and the skeleton structure 903, i.e., the target feature described above, can be determined. And further, a skinned model 907 is determined according to the target feature, the character model 902, and the skeleton hierarchy 903; wherein the skinned model is a second character model corresponding to the skeleton hierarchy in another posture. In addition, the detailed algorithmic process of the algorithm for skinning model 906 can refer to FIG. 8.

It can be seen that, through the algorithm for skinning the character model as illustrated in FIG. 9, each vertex can be effectively represented through extracting a feature set of the character model, and the binding feature (i.e., the target feature) can be obtained through deep learning in a graph convolution network, thereby improving the skinning accuracy and the skinning efficiency for the character model, and reducing workload of manual binding the character model and the skeleton hierarchy.

In the exemplary element of the present disclosure, the method for skinning the character model can further comprise:

performing a feature transformation process on the target feature to obtain influence probability on weight of the joint point in the skeleton hierarchy on the vertices in the first character model.

In the exemplary embodiment, optionally, the terminal device or the server can perform a feature transformation process on the target feature through a normalized exponential function (such as softmax function) to obtain influence probability on weight of the joint point in the skeleton hierarchy on the vertices in the first character model. Among them, the normalized exponential function (softmax function) is a generalization of logic function, and, it can compress a K-dimensional vector z with arbitrary real numbers into another K-dimensional real vector σ(z), making each element in a range of (0,1) and the sum of all elements be 1. The function can be expressed as:

$$\sigma(z)_j = \frac{e^{z_j}}{\sum_{k=1}^{K} e^{z_k}};$$

where j=1, ..., k.

It can be seen that the implementation of the optional embodiment can convert the target feature into an influence probability on weight of the joint points on the vertices of the character model, facilitating comparing the influence probability on weight with an actual influence probability on weight, and thus, parameters of the algorithm for skinning the character model can be adjusted accordingly, thereby improving the skinning accuracy and the skinning efficiency.

Figure 10:
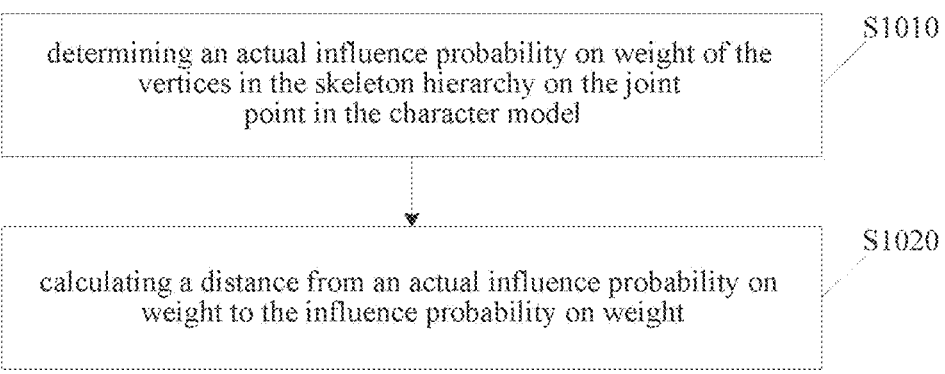
FIG. 10 schematically illustrates a flowchart of comparing influence probability on weight according to an embodiment of the present disclosure.

In the exemplary embodiment, optionally, please refer to FIG. 10, which schematically illustrates a flowchart of comparing influence probability on weight according to an embodiment of the present disclosure. As illustrated in FIG. 10, the method for skinning the character model can further comprise steps S1010 and 1020.

In step S1010, an influence probability on weight of vertices in the skeleton hierarchy on joint points in the first character model is determined; and in step S1020, a distance from an actual influence probability on weight to the influence probability on weight is calculated.

Hereinafter, the above steps of the present exemplary embodiment will be described in more detail.

In step S1010, an actual influence probability on weight of vertices in the skeleton hierarchy on joint points in the first character model is determined.

In the exemplary embodiment, the actual influence probability on weight can be obtained by reading the data in the database.

In step S1020, a distance from an actual influence probability on weight to the influence probability on weight is calculated.

In this exemplary embodiment, the influence probability on weight can be understood as a predicted influence probability on weight, and by comparing the predicted influence probability on weight with the actual influence probability on weight, the parameters of the algorithm for skinning the character model can be adjusted according to the distance from the actual influence probability on weight to the influence probability on weight, so as to make the distance from the determined predicted influence probability on weight to the actual influence probability on weight less than a preset value, thereby improving the skinning effect for the character model.

In the exemplary embodiment, optionally, the manner for calculating the distance from the actual influence probability on weight to the influence probability on weight can be: calculating the distance from the actual influence probability on weight to the influence probability on weight by through KL Divergence Loss; wherein, KL Divergence Loss is a relative entropy loss function that measures difference between two probability distributions in the same event space (e.g., the distance from the actual influence probability on weight to the influence probability on weight), and its physical meaning is: in the same event space, the probability distribution P(X) corresponds to each event, if the probability distribution Q(X) is used to encode, the average encoding length of each basic event is increased by how many bits. Its corresponding formula is:

$$D(P \| Q) = \sum_{x \in X} P(x) \log \frac{P(x)}{Q(x)};$$

where D(P∥Q) represents the KL distance, x is the event, and X is the event set.

In this exemplary embodiment, parameters of the algorithm for skinning the character model can be adjusted according to the distance from the actual influence probability on weight to the influence probability on weight, so as to make the distance from the determined predicted influence probability on weight to the actual influence probability on weight less than a preset value, thereby improving the skinning effect for the character model.

In the exemplary embodiment, optionally, the method for skinning the character model can further comprise the following step:

iteratively adjusting parameters corresponding to the nonlinear transformation process and the graph convolution process, respectively, according to the distance until an iteration number reaches a preset number, so as to make the distance less than a preset distance.

In the exemplary embodiment, optionally, iteratively adjusting parameters corresponding to the nonlinear transformation process and the graph convolution process, respectively, according to the distance until an iteration number reaches a preset number, so as to make the distance less than a preset distance can be: through a gradient descent algorithm, iteratively adjusting parameters corresponding to the nonlinear transformation process and the graph convolution process, respectively, according to the distance until an iteration number reaches a preset number, so as to make the distance less than a preset distance.

Wherein, the gradient descent algorithm solves the minimum value along the direction of the gradient descent (or, the maximum value can also be solved along the gradient ascent direction). Its corresponding iteration formula is: $a_{k+1} = a_k + \rho_k s^{-}(k)$. Where, $\Sigma^{-(k)}$ represents the descent direction of the gradient, and $\rho_k$ represents a searching step size in the gradient direction. When the gradient vector is equal to 0, it is indicated that the extreme point is reached, and the magnitude of the gradient is also 0.

In addition, the gradient descent algorithm may be a batch gradient descent method or a stochastic gradient descent method, which is not limited in the embodiments of the present disclosure. Specifically, the batch gradient descent method is to minimize a loss function of all the training samples, so that the final solution is the global optimal solution, that is, the parameters of the solution are to minimize the risk function, but the efficiency thereof for problems with large-scale samples is low; while the random gradient descent method is to minimize a loss function of each sample, in such case, the generally overall direction is the global optimal solution even though the loss function obtained in each iteration is not aimed at the global optimal solution, and the final result is often close to the global optimal solution, thereby being suitable for large-scale samples training.

In this exemplary embodiment, parameters of the algorithm for skinning the character model can be adjusted according to the distance from the actual influence probability on weight to the influence probability on weight, so as to improve the skinning accuracy and the skinning effect of the algorithm for skinning the character model.

In the exemplary embodiment, optionally, the method for skinning the character model can further comprise the following:

a character model corresponding to the skeleton hierarchy in a target postures is determined according to the influence probability on weight corresponding to the iteratively adjusted parameters.

In the exemplary embodiment, the target posture is different from the posture of the skeleton hierarchy obtained by step S310, According to the trained algorithm for skinning the character model, the server or the terminal device can determine a corresponding skinning effect according to the skeleton hierarchy in different postures to improve the efficiency of the skin.

In the exemplary embodiment, a corresponding skinning effect can be determined according to the skeleton hierarchy in different postures, so as to improve the skinning efficiency.

It can be seen that, through implementing the algorithm for skinning the character model as illustrated in FIG. 3, each vertex can be effectively represented through extracting a feature set of the character model, and the binding feature (i.e., the target feature) can be obtained through deep learning in graph convolution network, thereby improving the skinning accuracy and the skinning efficiency for the character model, and reducing workload of manual binding the character model and the skeleton hierarchy.

Figure 11:
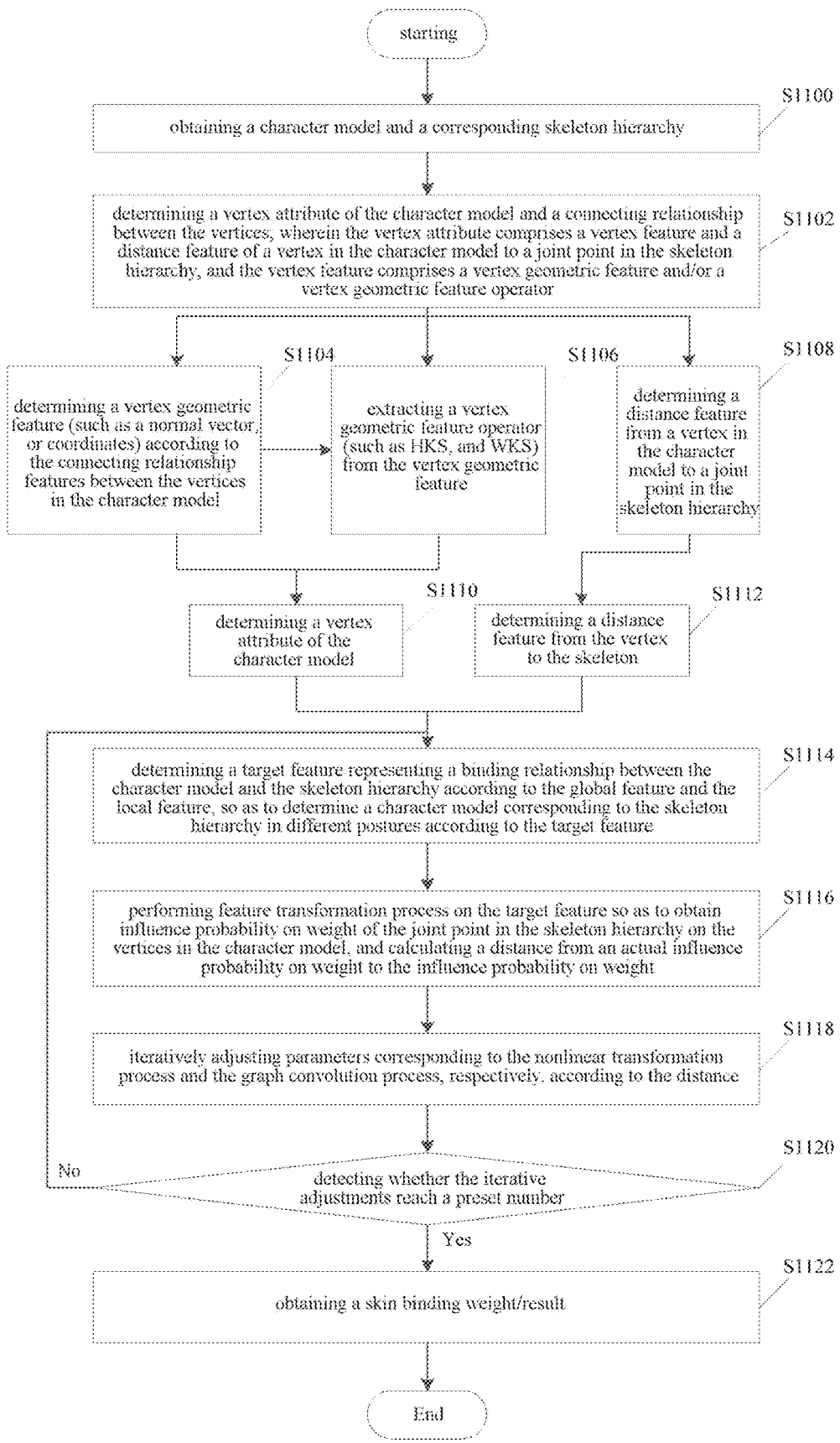
FIG. 11 schematically illustrates a flowchart of another method for skinning a character model according to an embodiment of the present disclosure.

Please refer to FIG. 11, which schematically illustrates a flowchart of another method for skinning a character model according to an embodiment of the present disclosure. As illustrated in FIG. 11, the another method for skinning a character model comprises: step S1100, step S1102, step S1104, step S1106, step S1108, step S1110, step S1112, step S1114, step S1116, step S1118, step S1120, and Step S1122.

In step S1110, a first character model and a corresponding skeleton hierarch are obtained.

In step S1102, a connecting relationship between the vertices in the first character model and spatial coordinates of the vertices in the first character model, and the connecting relationship between the joint points in the skeleton hierarchy and spatial coordinates of the joint point in the skeleton hierarchy are determined, respectively.

In step S1104, a vertex geometric feature (such as a normal vector, or coordinates) is determined according to the connecting relationships between the vertices in the first character model.

In step S1106, a vertex geometric feature operator (such as HKS, and WKS) is extracted from the vertex geometric feature.

In step S1108, a distance feature from a vertex in the character model to a joint point in the skeleton hierarchy is determined.

Step S1110: a vertex attribute of the character model is determined.

In step S1112, a distance feature from a vertex in the character model to a bone in the skeleton hierarchy is determined.

In step S1114, a target feature representing a binding relationship between the character model and the skeleton hierarchy is determined according to the global feature and the local feature, so as to determine a character model corresponding to the skeleton hierarchy in different postures according to the target feature.

In step S1116, feature transformation process is performed on the target feature so as to obtain influence probability on weight of the joint point in the skeleton hierarchy on the vertices in the character model, and a distance from an actual influence probability to the influence probability on weight is calculated.

In step S1118, parameters corresponding to the nonlinear transformation process and the graph convolution process, respectively, are iteratively adjusted according to the distance.

In step S1120: whether the iterative adjustments reach a preset number is detected.

In step S1122: a skin binding weight/result is obtained.

Specifically, the server or the terminal device can first load the first character model and the corresponding skeleton hierarchy, and then extract original data from the first character model, comprising the coordinates of the vertices and the connecting relationship between the vertices; and extract the coordinates of the joint points in the skeleton hierarchy and the connecting relationship between the joint points in the skeleton hierarchy; and next, calculate a geometric feature of each vertex according to the coordinates of the vertices and the connecting relationship between the vertices, comprising a normal vector, a curvature, and etc, and a geometric feature operator is extracted according to the geometric feature, such as HKS and WKS, and splice the geometric feature and the coordinates of the vertices so as to obtain a low-level feature, and further, calculate the distance from the vertex to the joint point, as a distance feature associated with the joint pint, and then determine a target feature representing a binding relationship between the first character model and the skeleton hierarchy according to a global feature and a local feature, so as to determine a second character model corresponding to the skeleton hierarchy in different postures according to the target feature, wherein the global feature and the local feature are obtained by performing a graph convolution process and a multilayer nonlinear transformation process on the vertex attribute and the distance feature. Furthermore, a feature transformation process is performed on the target feature so as to obtain an influence probability on weight of the joint point in the skeleton hierarchy on the vertex of the character model, and a distance from the actual influence probability on weight to the influence probability on weight, so as to iteratively adjust the parameters respectively corresponding to the nonlinear transformation process and the graph convolution process, according to the distance, until the iteration number reaches the preset number, so as to make the distance less than a preset distance, thus, a binding weight for skinning, which is also called a skinning binding result, is obtained finally.

It can be seen that, through implementing the method as illustrated in FIG. 11, each vertex can be effectively represented through extracting a feature set of the character model, and the binding feature (i.e., the target feature) can be obtained through deep learning in graph convolution network, thereby improving the skinning accuracy and the skinning efficiency for the character model, and reducing workload of manual binding the character model and the skeleton hierarchy.

Figure 12:
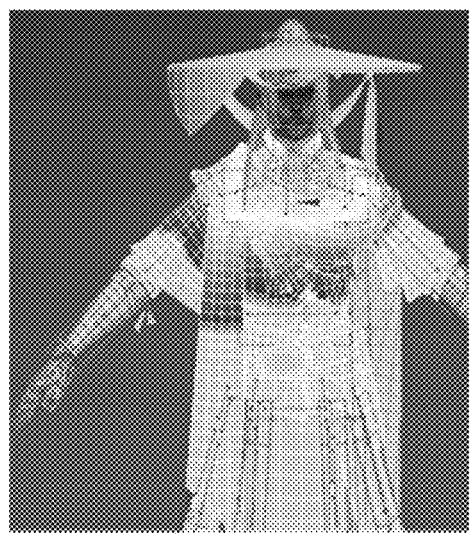
FIG. 12 schematically illustrates skinning effect according to an embodiment of the present disclosure, in which effect of joints is at the shoulder.
Figure 13:
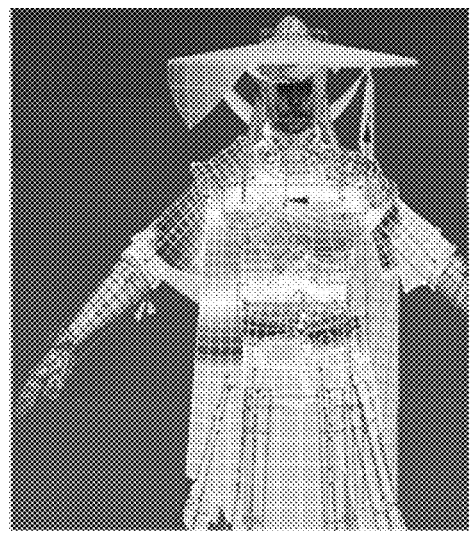
FIG. 13 schematically illustrates skinning effect according to an embodiment of the present disclosure, in which effect of joints is at the shoulder and at the chest.
Figure 14:
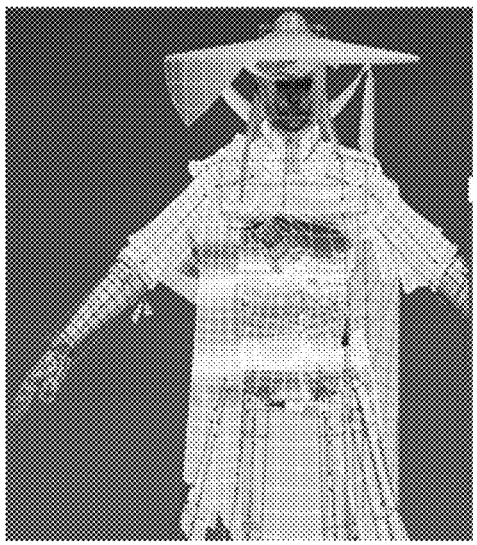
FIG. 14 schematically illustrates skinning effect according to an embodiment of the present disclosure, in which effect of joints is at the upper abdomen.
Figure 15:
FIG. 15 schematically illustrates skinning effect according to an embodiment of the present disclosure, in which effect of joints is at the lower abdomen.

Based on the flowchart of the another method for skinning the character model shown in FIG. 11, please refer to FIG. 12 to FIG. 15. FIG. 12 to FIG. 15, which illustrate the skinning effect on the character model, wherein FIG. 12 schematically illustrates skinning effect according to an embodiment of the present disclosure, in which effect of joints is at the shoulder; FIG. 13 schematically illustrates skinning effect according to an embodiment of the present disclosure, in which effect of joints is at the shoulder and at the chest; FIG. 14 schematically illustrates skinning effect according to an embodiment of the present disclosure, in which effect of joints is at the upper abdomen; and FIG. 15 schematically illustrates skinning effect according to an embodiment of the present disclosure, in which effect of joints is at the lower abdomen. Specifically, when the hierarchy of the bone in an influence range of the joint changes, the skinning area will also change accordingly, in order to achieve vivid animation effects of the character. In addition, since the method for skinning the character model according to the present disclosure can be applied to intelligent skinning for a character model, not only the artist's workload of skin binding work is reduced, but also the skin efficiency and skinning effect can be improved.

It should be noted that although the various steps of the method of the present disclosure are described in a particular order in the drawings, this does not require or imply that the steps must be performed in that particular order, or that all the steps illustrated must be performed to achieve the desired result. Additionally or alternatively, certain steps may be omitted, multiple steps may be combined into one step to be executed, and/or one step may be divided into multiple steps to be executed and the like.

Figure 16:
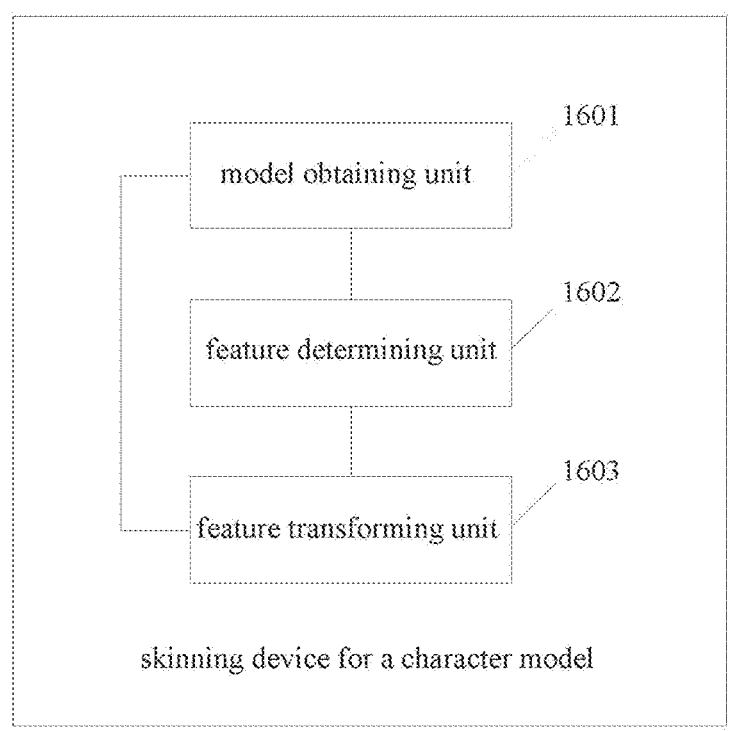
FIG. 16 schematically illustrates a structural diagram of a device for skinning a character model according to an embodiment of the present disclosure.

Furthermore, embodiments of the present disclosure provide a device for skinning a character model. The device for skinning the character model can be applicable to a server or terminal device. As illustrated in FIG. 16, the device for skinning the character model can comprise: a model obtaining unit 1601, a feature determining unit 1602, and a feature transforming unit 1603, wherein:

the model obtaining model 1601 is configured to obtain a first character model and a corresponding skeleton hierarchy;

the feature determining unit 1602 is configured to determine vertex attribute of the character model and connecting relationships between the vertices; wherein the vertex attribute comprises a vertex geometric feature operator and a distance feature from the vertices in the character model to joint points in the skeleton hierarchy;

the feature transforming unit 1603 is configured to perform a nonlinear transformation process on the vertex attribute to obtain a first feature, and to perform a graph convolution process on the connecting relationships and the first feature to obtain a second feature;

the feature transforming unit 1603 is further configured to perform nonlinear transformation process on the second feature to obtain a global feature of the character model, and to perform a graph convolution process on the second feature to obtain a local feature of the character model; and the feature determining unit 1602 is further configured to determine a target feature representing a binding relationship between the character model and the skeleton hierarchy according to the global feature and the local feature, so as to determine a character model corresponding to the skeleton hierarchy in different postures according to the target feature.

It can be seen that, through implementing the device for skinning the character model as illustrated in FIG. 16, each vertex can be effectively represented through extracting a feature set of the character model, and the binding feature (i.e., the target feature) can be obtained through deep learning in graph convolution network, thereby improving the skinning accuracy and the skinning efficiency for the character model, and reducing workload of manual binding the character model and the skeleton hierarchy.

In an exemplary embodiment of the present disclosure, the feature determining unit 1602 is further configured to determine the vertex geometric feature according to the connecting relationship between the vertices in the character model; wherein the vertex geometric feature comprises a normal vector and coordinates.

The device for skinning the character model further comprises a geometric feature operator extracting unit (not shown in the figure), wherein:

the geometric feature operator extracting unit is configured to extract a vertex geometric feature operator from the vertex geometric feature.

It can be seen that, through implementing the optional embodiment, the vertex geometric feature can be determined through the connecting relationship of the vertices, and then a target feature is extracted from the vertex geometric feature as a vertex geometric feature operator, so as to form a feature vector, and then a binding relationship between the character model and the skeleton hierarchy is determined through the feature vector, thereby improving the efficiency of manually binding the character model and the skeleton hierarchy to a certain extent, so as to improve the skinning efficiency.

In an exemplary embodiment of the present disclosure, the feature determining unit 1602 is further configured to determine the connecting relationship between the vertices in the first character model and spatial coordinates of the vertices in the first character model, and the connecting relationship between the joint points in the skeleton hierarchy and spatial coordinates of the joint points in the skeleton hierarchy, respectively;

the feature determining unit 1602 is further configured to determine a distance feature according to the connecting relationship between the vertices in the first character model and spatial coordinates of the vertices, and a connecting relationship between the joint points in the skeleton hierarchy, and spatial coordinates of the joint points.

It can be seen that, through implementing the optional embodiment, the feature determining unit 1602 can determine the distances from the vertices in the first character model to the joint points in the skeleton hierarchy, and further, the binding relationship between the first character model and the skeleton hierarchy can be determined, thereby improving the skinning accuracy and the skinning effect with respect to conventional manual binding.

In an exemplary element of the present disclosure, the device for skinning the character model further comprises an influence probability on weight determining unit (not shown in the figure), wherein:

the influence probability on weight determining unit is further configured to obtain influence probability on weight of the joint points in the skeleton hierarchy on the vertices in the first character model by performing feature transformation process on the target feature.

It can be seen that, implementing the optional embodiment, the target feature can be converted into the influence probability on weight of the joint points on the vertices in the first character model, so as to compare the influence probability on weight with the actual influence probability on weight, thus, parameters of the algorithm can be adjusted, thereby improving the skinning accuracy and the skinning effect.

In an exemplary embodiment of the present disclosure, the influence probability on weight determining unit is further configured to determine an actual influence probability on weight of the vertices in the skeleton hierarchy on the joint points in the first character model.

The device for skinning the character model further comprises a distance calculating unit (not shown in the figure), wherein the distance calculating unit is configured to calculate a distance from the actual influence probability on weight to the influence probability on weight.

It can be seen that, implementing the optional embodiment, parameters of the algorithm for skinning the character model can be adjusted according to the distance from the actual influence probability on weight to the influence probability on weight, so as to make the distance from the determined predicted influence probability on weight to the actual influence probability on weight less than a preset value, thereby improving the skinning effect for the character model.

In an exemplary element of the present disclosure, the device for skinning the character model further comprises a parameter adjusting unit (not shown in the figures), wherein:

the parameter adjusting unit is configured to iteratively adjust parameters respectively corresponding to the nonlinear transformation process and the graph convolution process, according to the distance until an iteration number reaches a preset number, so as to make the distance less than a preset distance.

In this exemplary embodiment, parameters of the algorithm for skinning the character model can be adjusted according to the distance from the actual influence probability on weight to the influence probability on weight, so as to improve the skinning accuracy and the skinning effect of the algorithm for skinning the character model.

In an exemplary element of the present disclosure, the device for skinning the character model further comprises a character model determining unit (not shown in the figures), wherein:

the character model determining unit is configured to determine a character model corresponding to the skeleton hierarchy in a target posture according to the influence probability on weight corresponding to the iteratively adjusted parameters.

It can be seen that, implementing the optional embodiment, a corresponding skinning effect can be determined according to the skeleton hierarchy in different postures, so as to improve the skinning efficiency.

It should be noted that although several modules or units for action performing has been mentioned in the foregoing description, such divisions are not mandatory. Indeed, in accordance with embodiments of the present disclosure, the features and functions of two or more modules or units described above can be embodied in one module or unit. On the contrary, the features and functions of one module or unit described above can be also be embodied in more module or units.

Since the respective functional modules of the device for skinning the character model according to the exemplary embodiment of the present disclosure correspond to the steps of the exemplary embodiment of the method for skinning the character model as described above, for details not disclosed in the device embodiments of the present disclosure, please refer to the embodiments of the method for skinning the character model described above.

Other embodiments of the present disclosure will be apparent to one of ordinary skill in the art after considering the specification and practicing the embodiments disclosed herein. The present disclosure is intended to cover any variations, applications, or adaptive modifications of the present disclosure, which are in accordance with the general principles of the disclosure and comprise common general knowledge or common technical means in the art that are not disclosed in the present disclosure. The specification and embodiments are merely illustrative, and the protection scope and the spirit of the present disclosure are set forth by the claims.

It should be understood that the present disclosure is not limited to the details illustrated in the figures and described in the specification, and various variations and modifications can be made without departing the scope of the present disclosure. And the scope of the present disclosure is only limited by the appended claims. The scope of the disclosure is to be limited only by the appended claims.

What is claimed is:

1. A method for skinning a character model, comprising:
obtaining a first character model and a corresponding skeleton hierarchy;
determining a vertex attribute of the first character model and a connecting relationship between the vertices, wherein the vertex attribute comprises a vertex feature and a distance feature of a vertex in the first character model to a joint point in the skeleton hierarchy, and the vertex feature comprises a vertex geometric feature and/or a vertex geometric feature operator;
determining a distance feature according to the connecting relationship between the vertices in the first character model and spatial coordinates of the vertices, a connecting relationship between the joint points in the skeleton hierarchy and spatial coordinates of the joint points;
performing a nonlinear transformation process on the vertex attribute to obtain a first feature, and performing a graph convolution process on the connecting relationship and the first feature to obtain a second feature;
performing a nonlinear transformation process on the second feature to obtain a global feature of the first character model, and performing a graph convolution process on the second feature to obtain a local feature of the first character model; and
determining a target feature representing a binding relationship between the first character model and the skeleton hierarchy according to the global feature and the local feature, so as to determine a second character model corresponding to the skeleton hierarchy in different postures according to the target feature,
wherein said performing the nonlinear transformation process on the vertex attribute to obtain the first feature comprises:
inputting the vertex attribute as an input feature into a first multi-layer perceptron to make the vertex attribute subjected to a multi-layer nonlinear transformation process in the first multi-layer perceptron; and
outputting the first feature corresponding to the vertex attribute;
wherein said performing the nonlinear transformation process on the second feature to obtain the global feature of the first character model comprises:
inputting the second feature into a second multi-layer perceptron to make the second feature subjected to a multilayer nonlinear transformation process in the second multi-layer perceptron;
outputting an interlayer feature after transformation process;
performing a maximum pooling process on the interlayer feature to obtain a pooling feature; and
duplicating the pooling feature to obtain a global feature corresponding to the second feature.

2. The method according to claim 1, further comprising:
determining a vertex geometric feature according to the connecting relationship between the vertices in the first character model; wherein the vertex geometric feature comprises a normal vector and coordinates; and
extracting the vertex geometric feature operator from the vertex geometric feature.

3. The method according to claim 1, further comprising:
performing a feature transformation process on the target feature to obtain an influence probability on weight of the joint point in the skeleton hierarchy on the vertices in the first character model.

4. The method according to claim 3, further comprising:
determining an actual influence probability on weight of vertices in the skeleton hierarchy on joint points in the first character model; and
calculating a distance between the actual influence probability on weight and the influence probability on weight.

5. The method according to claim 4, further comprising:
iteratively adjusting parameters respectively corresponding to the nonlinear transformation process and the graph convolution process according to the distance until an iteration number reaches a preset number, so as to make the distance less than a preset distance.

6. The method according to claim 5, further comprising:
determining the second character model corresponding to the skeleton hierarchy in a target posture according to the influence probability on weight corresponding to the iteratively adjusted parameters.

7. A non-transitory computer-readable medium having a computer program stored thereon, the computer program being executed by a processor to:
obtain a first character model and a corresponding skeleton hierarchy;
determine a vertex attribute of the first character model and a connecting relationship between the vertices, wherein the vertex attribute comprises a vertex feature and a distance feature of a vertex in the first character model to a joint point in the skeleton hierarchy, and the vertex feature comprises a vertex geometric feature and/or a vertex geometric feature operator;
determine a distance feature according to the connecting relationship between the vertices in the first character model and spatial coordinates of the vertices, a connecting relationship between the joint points in the skeleton hierarchy and spatial coordinates of the joint points;
perform a nonlinear transformation process on the vertex attribute to obtain a first feature, and performing a graph convolution process on the connecting relationship and the first feature to obtain a second feature;
perform a nonlinear transformation process on the second feature to obtain a global feature of the first character model, and performing a graph convolution process on the second feature to obtain a local feature of the first character model; and
determine a target feature representing a binding relationship between the first character model and the skeleton hierarchy according to the global feature and the local feature, so as to determine a second character model corresponding to the skeleton hierarchy in different postures according to the target feature, wherein said perform the nonlinear transformation process on the vertex attribute to obtain the first feature comprises:
  input the vertex attribute as an input feature into a first multi-layer perceptron to make the vertex attribute subjected to a multi-layer nonlinear transformation process in the first multi-layer perceptron; and
  output the first feature corresponding to the vertex attribute;
wherein said perform the nonlinear transformation process on the second feature to obtain the global feature of the first character model comprises:
  input the second feature into a second multi-layer perceptron to make the second feature subjected to a multilayer nonlinear transformation process in the second multi-layer perceptron;
  output an interlayer feature after transformation process;
  perform a maximum pooling process on the interlayer feature to obtain a pooling feature; and
  duplicate the pooling feature to obtain a global feature corresponding to the second feature.

8. An electronic device, comprising:
one or more processors; and
a storage device for storing instructions executable by the processor;
wherein the processor is configured to:
obtain a first character model and a corresponding skeleton hierarchy;
determine a vertex attribute of the first character model and a connecting relationship between the vertices, wherein the vertex attribute comprises a vertex feature and a distance feature of a vertex in the first character model to a joint point in the skeleton hierarchy, and the vertex feature comprises a vertex geometric feature and/or a vertex geometric feature operator;
determine a distance feature according to the connecting relationship between the vertices in the first character model and spatial coordinates of the vertices, a connecting relationship between the joint points in the skeleton hierarchy and spatial coordinates of the joint points;
perform a nonlinear transformation process on the vertex attribute to obtain a first feature, and performing a graph convolution process on the connecting relationship and the first feature to obtain a second feature;
perform a nonlinear transformation process on the second feature to obtain a global feature of the first character model, and performing a graph convolution process on the second feature to obtain a local feature of the first character model; and
determine a target feature representing a binding relationship between the first character model and the skeleton hierarchy according to the global feature and the local feature, so as to determine a second character model corresponding to the skeleton hierarchy in different postures according to the target feature,
wherein the processor is configured to:
  input the vertex attribute as an input feature into a first multi-layer perceptron to make the vertex attribute subjected to a multi-layer nonlinear transformation process in the first multi-layer perceptron; and
  output the first feature corresponding to the vertex attribute;
wherein the processor is configured to:
  input the second feature into a second multi-layer perceptron to make the second feature subjected to a multilayer nonlinear transformation process in the second multi-layer perceptron;
  output an interlayer feature after transformation process;
  perform a maximum pooling process on the interlayer feature to obtain a pooling feature; and
  duplicate the pooling feature to obtain a global feature corresponding to the second feature.

9. The electronic device according to claim 8, wherein the processor is further configured to:
determine a vertex geometric feature according to the connecting relationship between the vertices in the first character model; wherein the vertex geometric feature comprises a normal vector and coordinates; and
extract the vertex geometric feature operator from the vertex geometric feature.

10. The electronic device according to claim 8, wherein the processor is further configured to:
perform a feature transformation process on the target feature to obtain an influence probability on weight of the joint point in the skeleton hierarchy on the vertices in the first character model.

11. The electronic device according to claim 10, wherein the processor is further configured to:
determine an actual influence probability on weight of vertices in the skeleton hierarchy on joint points in the first character model; and
calculate a distance between the actual influence probability on weight and the influence probability on weight.

12. The electronic device according to claim 11, wherein the processor is further configured to:
iteratively adjust parameters respectively corresponding to the nonlinear transformation process and the graph convolution process according to the distance until an iteration number reaches a preset number, so as to make the distance less than a preset distance.

13. The electronic device according to claim 12, wherein the processor is further configured to:
determine the second character model corresponding to the skeleton hierarchy in a target posture according to the influence probability on weight corresponding to the iteratively adjusted parameters.

\* \* \* \* \*